US011200718B1

(12) United States Patent
Meyer et al.

(10) Patent No.: US 11,200,718 B1
(45) Date of Patent: Dec. 14, 2021

(54) SYSTEMS AND METHODS FOR LOCAL AUGMENTED-REALITY RENDERING

(71) Applicant: UIPCO, LLC, San Antonio, TX (US)

(72) Inventors: Gregory Brian Meyer, San Antonio, TX (US); Mark Anthony Lopez, Helotes, TX (US); Ravi Durairaj, San Antonio, TX (US); Nolan Serrao, Plano, TX (US); Victor Kwak, Frisco, TX (US); Ryan Thomas Russell, San Antonio, TX (US); Christopher Russell, The Colony, TX (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/887,474

(22) Filed: May 29, 2020

(51) Int. Cl.
| | | |
|---|---|---|
| *G06T 11/60* | (2006.01) | |
| *H04L 29/06* | (2006.01) | |
| *G06Q 50/16* | (2012.01) | |
| *G06F 16/587* | (2019.01) | |
| *G06F 16/54* | (2019.01) | |

(52) U.S. Cl.
CPC ............... *G06T 11/60* (2013.01); *G06F 16/54* (2019.01); *G06F 16/587* (2019.01); *G06Q 50/16* (2013.01); *H04L 67/38* (2013.01)

(58) Field of Classification Search
None
See application file for complete search history.

(56) References Cited

U.S. PATENT DOCUMENTS

| | | | | |
|---|---|---|---|---|
| 5,736,977 A | * | 4/1998 | Hughes | ................... G06F 16/40 |
| | | | | 715/716 |
| 2015/0126219 A1 | * | 5/2015 | Eaton | ..................... H04W 4/80 |
| | | | | 455/456.2 |
| 2017/0178222 A1 | * | 6/2017 | High | ...................... G01N 33/24 |
| 2018/0165984 A1 | * | 6/2018 | Waldron | ................. G09B 5/02 |
| 2019/0304008 A1 | * | 10/2019 | Cen | .................... G06Q 30/0629 |
| 2020/0175576 A1 | * | 6/2020 | Born | .................. G06Q 30/0643 |

* cited by examiner

*Primary Examiner* — Jennifer Mehmood
*Assistant Examiner* — Jed-Justin Imperial
(74) *Attorney, Agent, or Firm* — Plumsea Law Group, LLC

(57) ABSTRACT

System and a method for rendering augmented-reality (AR) enhanced images and information to potential home buyers by providing the AR-enhanced images over a local network. The system includes a computer loaded with an AR application configured to communicate with potential home buyers' personal devices, which have an AR application for communicating with that computer. The potential home buyers can then take a virtual tour of the house, with images that show the different rooms of the house, rendered by the AR to display rooms populated with the home buyers' furniture.

20 Claims, 12 Drawing Sheets

SYSTEMS AND METHODS FOR LOCAL AUGMENTED-REALITY RENDERING

TECHNICAL FIELD

This disclosure relates to using augmented reality rendering to inform and enrich the home buyers' experiences who may be considering whether to purchase, rent or lease a house, condominium, or other residence.

BACKGROUND

Potential home buyers may often drive by selected neighborhoods in which they might be interested in possibly purchasing a home, to determine whether they may like one or more of the neighborhoods or to find out if there are any suitable homes for sale in any of those neighborhoods. In some cases, the potential home buyers are accompanied by a real estate agent. In other cases, the potential buyers may be driving around on their own, to make a preliminary assessment of which neighborhoods they may want to settle in. In the latter cases, real estate agents may want to identify such home potential buyers, and may also wish to provide the home buyers with relevant information regarding homes for sale in as attractive and informative a way as possible. In either set of cases, the interests of the potential home buyers and real estate agents are at least somewhat aligned as they work to find attractive homes for sale at prices within the home buyers' budgets.

For those reasons, there is a need for efficiently and effectively providing the home buyers with attractive presentations of homes for sale in the selected neighborhoods.

SUMMARY

In one aspect, embodiments include a method for providing augmented-reality enhanced images of a house that is for sale. The method includes providing a first augmented-reality application on a computer located at the house, and providing a second augmented-reality application on potential buyers' personal devices. The method also includes providing a router connected to the computer that is configured to communicate with the potential buyers' personal devices. Images of rooms in the house are transmitted to personal devices carried by the potential buyers. The potential buyers can then manipulate the images to create enhanced-reality images of the rooms in the house.

In another aspect, embodiments include an augmented-reality system that includes a computer loaded with a first augmented-reality application and a personal device controlled by a potential home buyer that is loaded with a second augmented reality application. The system also includes a router configured to enable communications between the computer and the personal device such that images may be transmitted between the computer and the personal device using the first augmented-reality application and the second augment-reality application. The personal device is configured to allow the potential home buyer to manipulate the images to create augmented-reality images.

In yet another aspect, embodiments include a method for generating augmented-reality images of rooms in a house that is for sale. The method includes transmitting plans of the floors in the house via a router from a computer in the house to a personal device controlled by a potential home buyer. The method then includes selecting a room in the house by identifying the room using the plan of floors in the house, then selecting an image of an item to be combined with an image of the selected room, and manipulating the image of the selected room by inserting the image of the selected item into the image of the selected room to create an augmented-reality room image. Either the computer or the personal device has an augmented-reality application that can combine the image of the selected room with the image of the selected item.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

DESCRIPTION OF EMBODIMENTS

Figure 1:
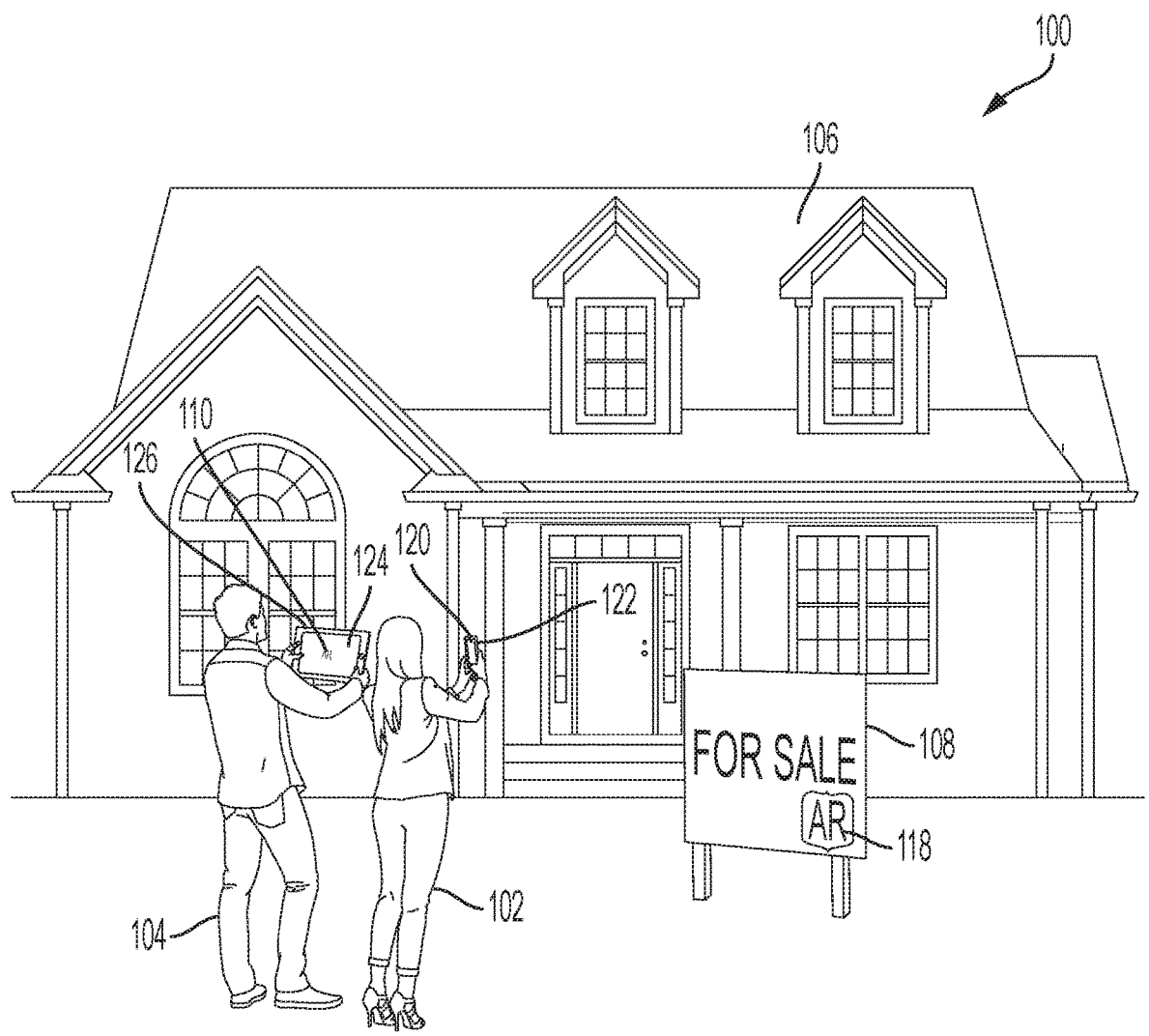
FIG. 1 is an illustration of an exemplary home for sale in a residential neighborhood.

The embodiments disclosed herein provide a method and system whereby a home owner with a house for sale could provide an augmented-reality (AR) based interaction for potential home buyers who might drive by the home owner's house or might visit the house themselves. The AR rendering could be used to display different views of the house on personal devices controlled by the potential buyers, for example, by showing enhanced images of the house in the springtime with children playing in the front yard, or by showing the house as it might be decorated for a festive occasion, such as Christmas or Halloween. It might provide information such as the dimensions of the house and the lot size, for example. It could also show features of the interior of the house, such as its floor plans, and images of its kitchen and bathrooms, for example. The AR system may also allow potential buyers to manipulate the images, as described below.

As used herein, the term "personal device" shall refer to a smart phone, a tablet, a notebook computer, a laptop computer and any other device that can communicate wirelessly with another device and has a display for showing images. The term "home computer" shall refer to a computer in the house or other residence that is operated by the home owner or other person operating a computer with the home owner's authorization. The terms "application" and "module" are used interchangeably herein. The term "home buyer" shall mean a person who is considering buying, leasing or renting a house, condominium, apartment, other residence or office. The term "office computer" shall refer to a computer at a remote location, for example a computer at a real estate office, at a real estate agent's home, or at some other location that is remote to the house that is for sale.

AR rendering refers to using an application program interface (or API) that allows a computer system to define images such that they appear to be overlaid on specific real-world objects. Thus AR rendering may be an interactive experience in which a real-world environment is enhanced by computer-generated images or other information. The AR system may combine images captured in real time by, for example, a camera on a personal device, with images stored on or generated by a home computer. The AR systems generally have the capability of combining different images while maintaining registrations of the different images in the combined images.

In some embodiments, the AR is provided by the home computer. The home computer may be in communication with the office computer over the Internet, over a cable system over telephone lines, over a satellite system or over some other system that provides for communication between two remote devices. The AR rendering might have been, for example, pushed by the office computer onto the home computer. The home computer may be a dedicated computer provided by the real estate agent, or it may be the home owner's personal computer.

In some embodiments, potential home buyers may have specific applications on their personal devices that can determine whether a particular house for sale may offer an AR experience via an extended local network. The applications could then automatically connect to the extended local network controlled by the home computer, so that the personal devices may receive AR images of the house as described above, or create new AR images. The applications may also provide information regarding the neighborhood, such as the availability of public transportation, the location of schools, or the location of public libraries, for example. In other embodiments, the home computer may detect the presence of persons having AR-enabled personal devices, and may initiate the communication itself.

In a typical case, a home owner may list his or her house for sale with a real estate agent. The real estate agent may work from a location such as a real estate office, for example, or from another location. This location might have a computer in an office that is loaded with AR software. This office computer can communicate over the Internet, a cable system or some other system with a home computer in the home owner's house. The office computer could then push the AR application onto the home computer, together with different enhanced images of the house at different times of the year, floor plans, dimensions, lot size and other information regarding the house, for example. It may also include additional information such as the list price of the house and the tax history for the house, for example.

The information stored on the home computer and/or the office computer may further include, for example, neighborhood information such as the identification and location of institutions such as public schools, public libraries, religious institutions, fire departments and recreational facilities, for example. It may further include information regarding the neighborhood, such as whether the garbage and/or recyclables pickup is public or private, as well as the schedule for such pickups, for example.

In some embodiments, potential buyers who may pass by the house for sale or may have an appointment to inspect the house may have applications on their personal devices that allow for the direct communication between the home computer and the personal devices once the personal devices are within range of an extended dedicated local network, as described below. Because the communication between the home computer and the personal device is a direct communication over the dedicated extended local network, the AR rendering appears to be essentially in real time, such that potential buyer may experience the AR-enhanced images with no apparent latency.

The house floor plans, dimensions and other features of the house may have been determined by a person using a LIDAR device, for example, in order to obtain accurate dimensional information of the house, including the dimensions of any additions or modifications to the house (including its basement, if any) or its garage, for example. The LIDAR inspection could also be used to identify the positions and dimensions of features such as refrigerators, stoves, dishwashers, kitchen sinks, countertops, washing machines, dryers, bathroom amenities, closets and so on. The house and garage dimensions should include the height of the rooms and the garage, so that potential homeowners could evaluate whether or how their furniture might fit, and/or whether their personal vehicles would comfortably fit in the garage. If the house does not have solar panels, but is a good candidate based upon its location and orientation, that information may also be included. All of this information could be stored on the office computer as well as on the home computer.

Other information that may also be stored on either or both computers might include the locations of electrical outlets, ceiling fixtures, wall switches. It may also identify, for example, the locations of 240-volt outlets. For example, home buyers may wish to ensure that a 240-volt outlet is available for a dryer, and whether the garage may have a 240-volt outlet for recharging an electrical vehicle, snowblower or other battery-powered product. Additional information such as the age of a furnace or air-conditioning system, the age of the house and/or the age of the roof, the gutters and the driveway, for example, may also be included.

Information may also be stored on the personal devices of the potential home buyers. For example, the potential home buyers may have stored images and dimensions of furniture such as beds, sofas, coffee tables, dining room and/or kitchen tables, desks, chairs, television sets, bookcases and/or entertainment consoles, for example. To do this, the potential buyers would only have to take photos of their furniture and load those photos into a storage location on their personal device. In some cases, the photo may include an image of one or several yardsticks or rulers lying on, against, or next to the specific item of furniture. In those cases, the image storage app may include algorithms for calculating the dimensions of the item of furniture based upon the image of the yardsticks and/or rulers. In other cases, the potential buyers may measure the size of the items of furniture (for example by using LIDAR), and store that information in the image storage app linked to the specific item of furniture. The images stored in the personal devices' image storage app could also be images and dimensions of furniture the potential home buyers are considering buying, for example.

FIG. 1 is an exemplary illustration 100 showing a woman 102 and a man 104 looking at a house 106. The house has a realtor's "For Sale" sign 108, and a tree in the front yard. In this illustration, the woman 102 and the man 104 are potential home buyers. The real estate sign has a prominent "AR" logo 118 in its bottom right-hand corner. The woman is looking at the display 120 of a smart phone 122 that she is holding in her hand; the man 104 is looking at a display 124 on a tablet 126 that he is holding in his hand. This woman and this man may have an appointment with a realtor to see this particular house, or they may be driving around one neighborhood or several neighborhoods to identify houses that they might be interested in buying. In either case, the AR system offers the potential buyers the opportunity to view images of the house at different times of the day and/or different seasons of the year, as well as providing them with useful information as described above.

Figure 2A:
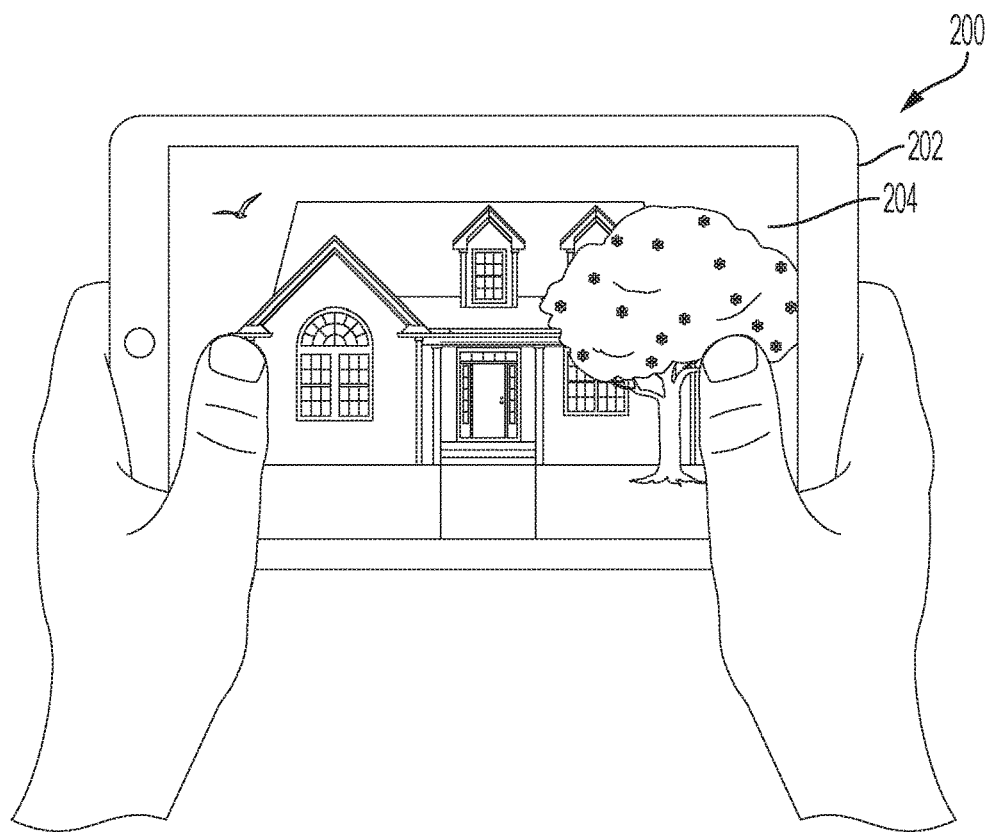
FIG. 2 show depictions of the home shown in FIG. 1 as they might appear during different seasons, and as they might be displayed on the display of a personal device.
Figure 2B:
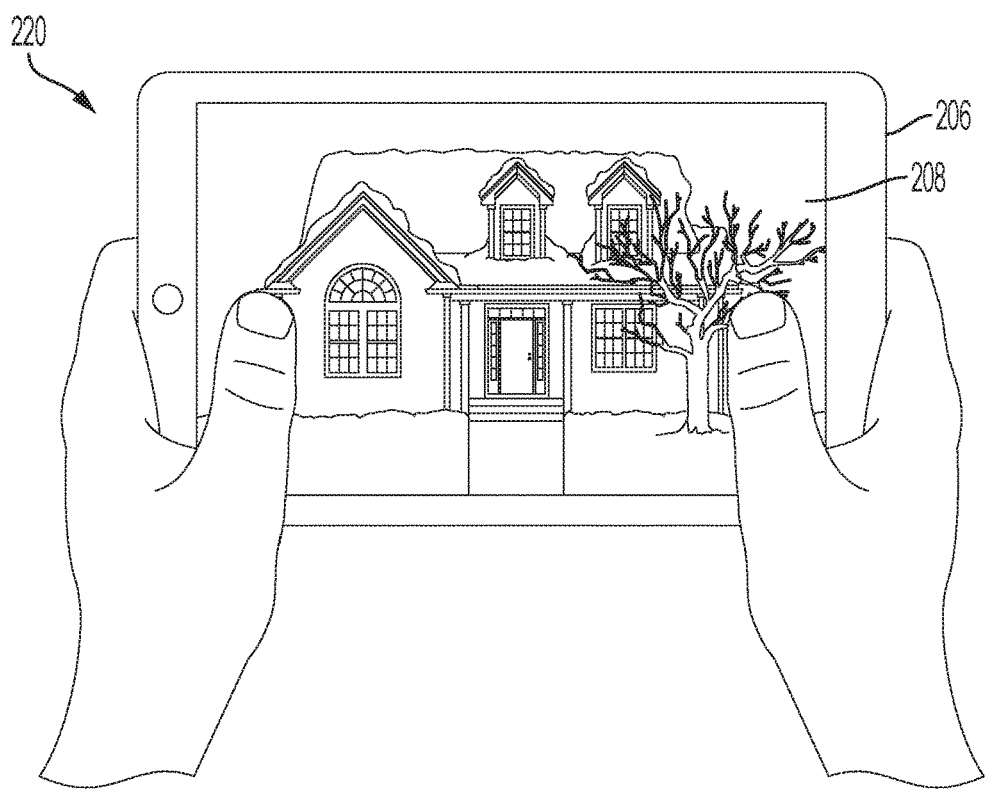

FIG. 2A and FIG. 2B illustrate two examples of images that may be shown on display 120 or display 124. For example, the illustration 200 in FIG. 2A of a tablet 202 with a display 204 shows an image of the house in springtime, with the tree in bloom. Illustration 220 in FIG. 2B on a tablet 206 may show an image the house in the winter on display 208, with snow on the ground and on the roof. Other available displays may show the house at various times of day, or may show an aerial view of the house or of the neighborhood, or may show a view of the back yard. In another example, the display may show children playing in the front yard.

Figure 3:
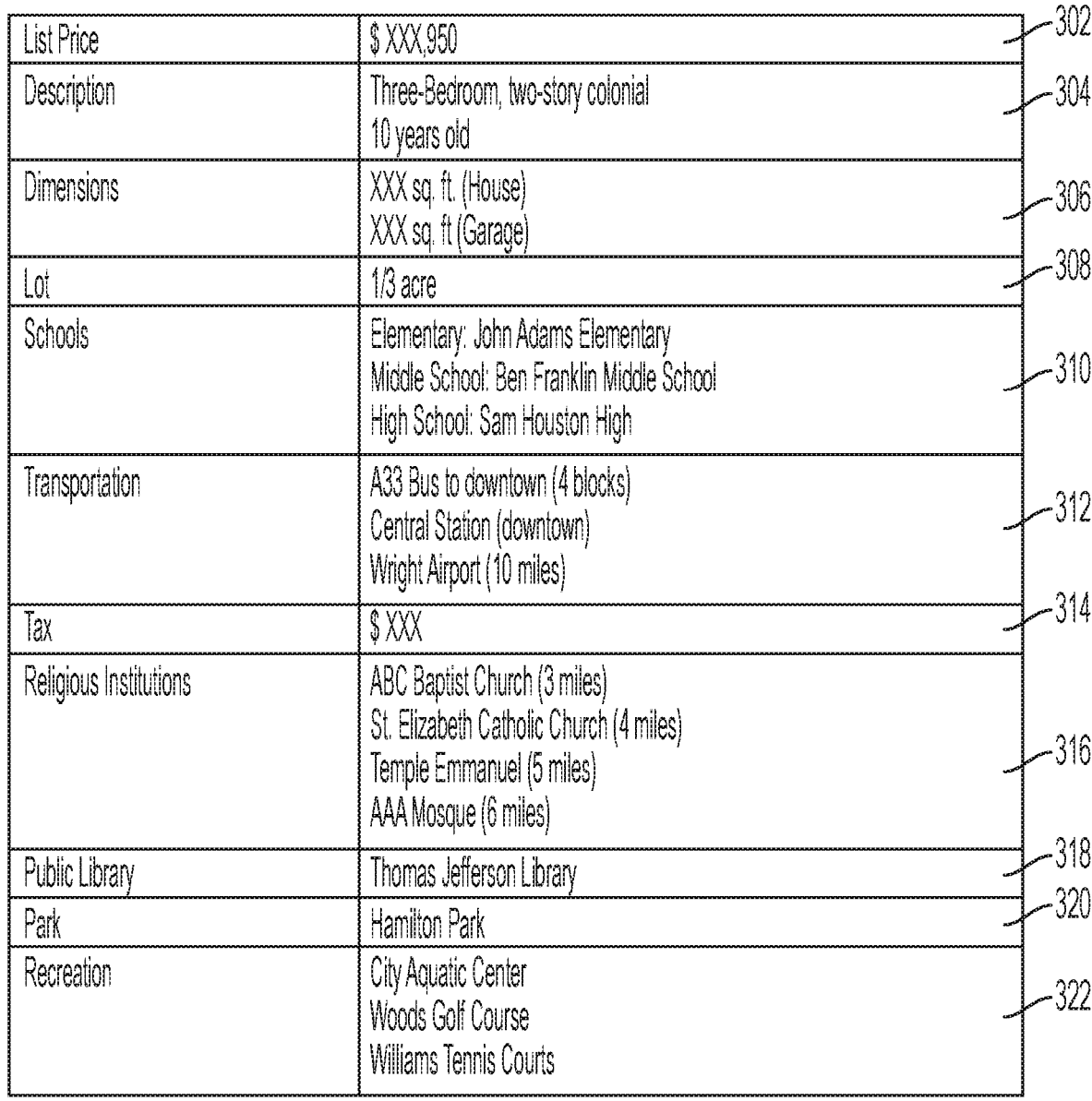
FIG. 3 is an exemplary chart showing information that might be transmitted to a potential home buyer's personal device.

FIG. 3 is an example of a chart 300 that may be rendered by the AR system to potential home buyers, for example by being superimposed upon the image of the house. The chart may include, for example, entries for the list price 302 of the house, a brief description 304 of the house, the dimensions of the residence and the garage 306, and the lot size 308. It may also include, for example, entries for the identification of public schools 310, a list of transportation options 312 and the estimated property tax 314. Further entries may be, for example, a list of religious institutions 316, the closest public library 318, the closest park 320 and a list of various available recreational facilities 322. This information, as well as other information of this kind, may be useful to potential buyers as they decide whether to consider buying that particular home.

Figure 4:
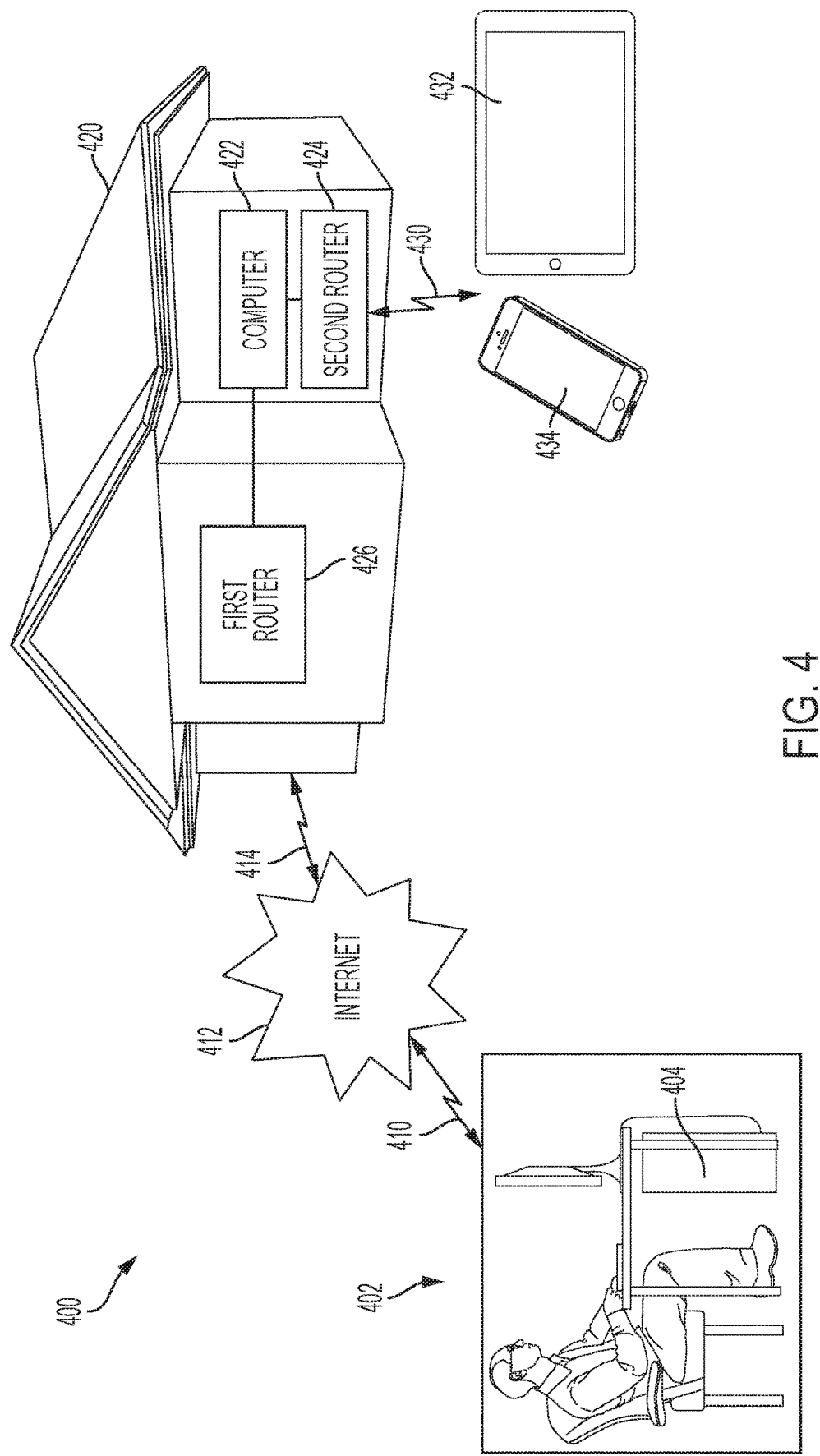
FIG. 4 is a schematic diagram showing the communication infrastructure between a server at a real estate office, a personal computer in a home owner's house and potential buyers' personal devices, in an embodiment.

As shown in FIG. 4, the AR rendering system needed to render AR-enhanced images may require communications between at least three systems: a server at a remote location, such as a real estate office or at a real estate agent's home; a computer with its attendant router(s) in a house that is being offered for sale; and one or more personal devices operated by potential home buyers.

FIG. 4 is a schematic diagram illustrating the communications between these three systems, in an embodiment. For example, server 404 in real estate office 402 is in communication via a link 410 with Internet 412, which in turn is in communication via a link 414 with first router 426 in the house 420 that is for sale. Communication link 410 and communication link 414 may be wireless links, or may be links over cable or over telephone systems, or may be a combination of such communication systems. First router 426 in house 420 receives a package of information, including data and images specific to house 420 and to the neighborhood of house 420 from server 404, and provides that information to home computer 422. Alternatively, the information may be provided to home computer 422 via another medium, such as a thumb drive, so as to maintain complete separation between the home local network controlled by the first router and the extended local network controlled by the second router. Maintaining such separation improves the security of the home local network.

In some embodiments the home only uses one router, which could be used to control a home local network that may be used for typical home usages such as paying bills online, locating restaurants, getting directions, and so on, as well as for communicating with potential home buyers outside the home. In those embodiments, the single router performs the procedures described below in other embodiments for the second router. In those other embodiments, computer 422 uses a second router 424 which is dedicated solely for wireless communications over a separate dedicated extended local network 430 with personal devices such as a tablet 432 and a smart phone 434, for example, that may be operated by potential home buyers. Typically, first router 426 may be connected to the Internet over a cable system, for example, and then is either hard-wired to computer 422, or communicates wirelessly with computer 422 over a home local network. In either case, communication from second router 424 with personal devices 432 and 434 held by potential home buyers is strictly independent of communications over the Internet 412 via first router 426. This ensures that passersby may not inadvertently or intentionally gain access to the home owners' personal data and activities via home computer 422.

As noted above, in some embodiments, computer 422 may be a computer provided by the real estate company that is dedicated to communications with potential home buyers and is separate from other computers that may be used by the homeowners and their family, for example. Information and images may be pre-loaded into computer 422 at the real estate office (or in the home using a media storage device such as a thumb drive), for example, to avoid sending data over the Internet. In any event, firewalls and other security devices or protocols may be used to protect the home network from unauthorized access.

In some embodiments, the communications between home computer 422 and personal devices 432 and 434 over second router 424 are over a separate extended local network 430, that may use a different SSID, for example, than does the home local network. The range of the extended local network controlled via second router 424 is typically greater than the range of the home local network, since it must reach potential buyers' personal devices out on the street, for example.

Figure 5A:
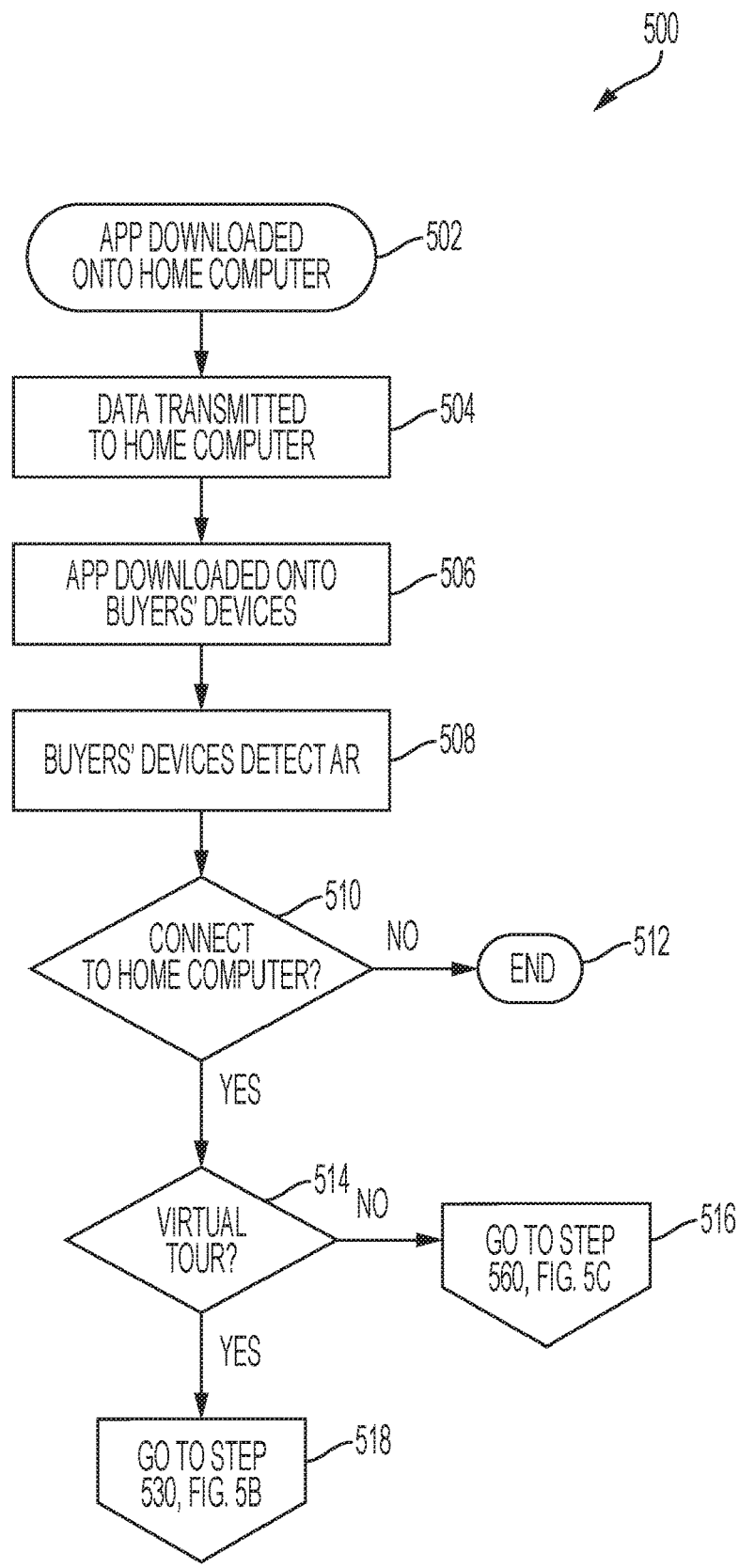
FIG. 5A, FIG. 5B and FIG. 5C are flowcharts illustrating exemplary communications between a personal computer in a home owner's house and a potential buyer's personal device.
Figure 5B:
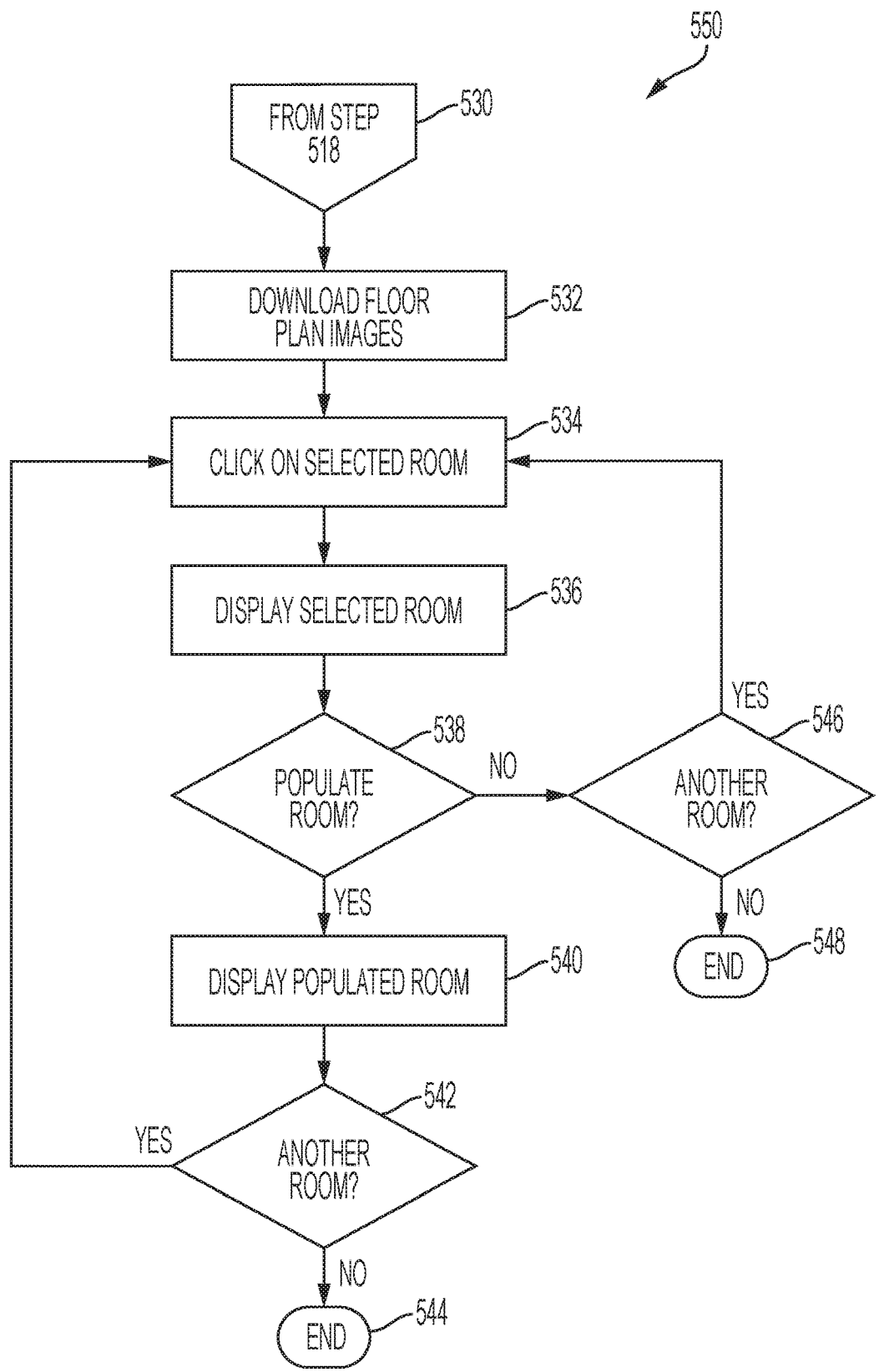
Figure 5C:
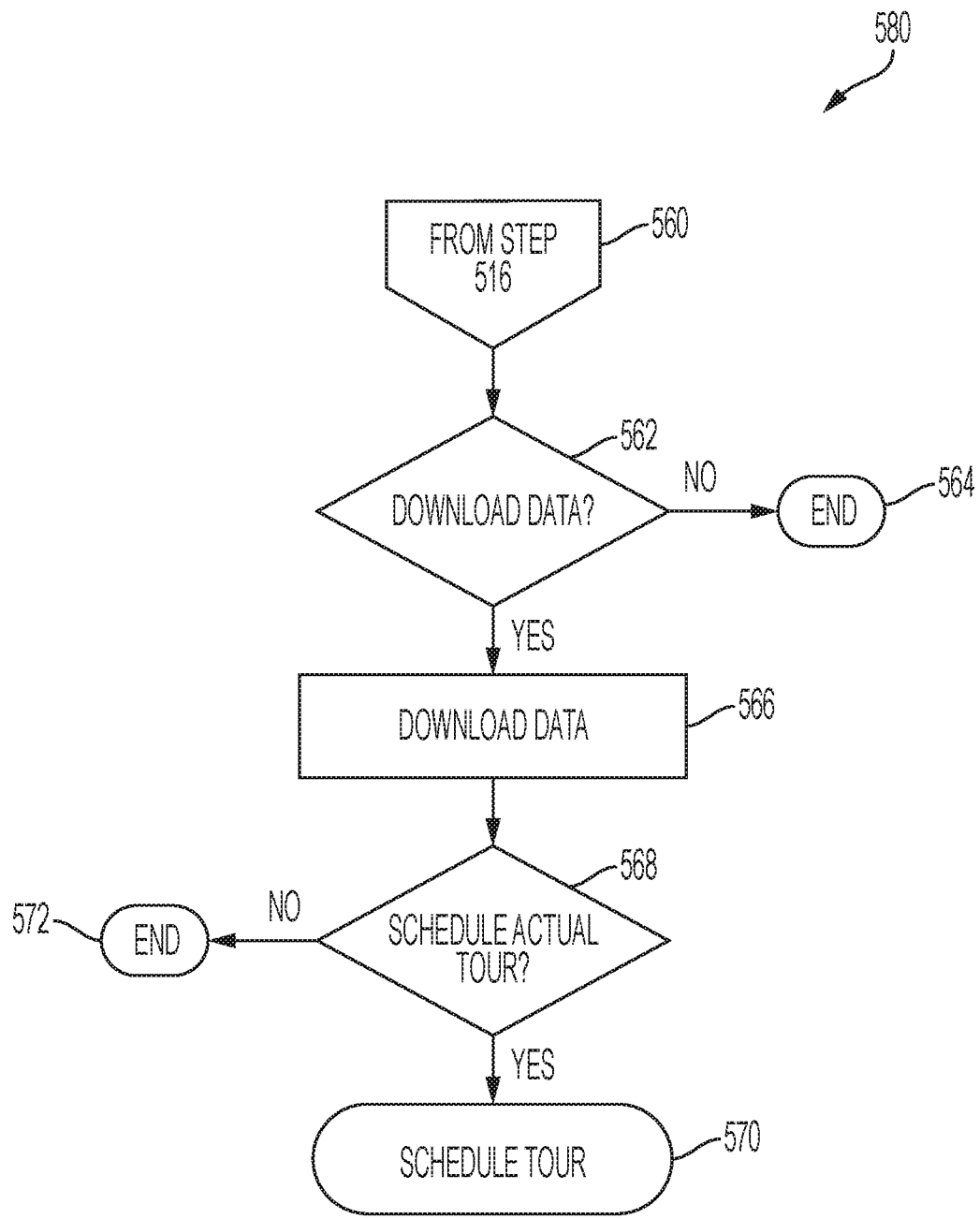

FIG. 5A, FIG. 5B and FIG. 5C are flowcharts that outline possible communication processes that may be used, in some embodiments, between home computer 422 and personal devices 432 and 434, shown in FIG. 4. Exemplary flowchart 500 shown in FIG. 5A starts with step 502 when an application (described below) for implementing communications with potential home buyers is downloaded into home computer 422. Data including information and images specific to the house for sale and its neighborhood, is then transmitted to the home computer in step 504. Typically, possibly at some other time and place, another app (described below) is downloaded in step 506 onto personal devices controlled by potential buyers, so that those devices can communicate with home computers such as home computer 422. The potential buyers are alerted by the "AR" logo 118 on the real estate firm's "For Sale" sign that augmented reality presentations are available at that home.

The buyers' devices may then detect the existence of an AR capability in the house that is for sale in step 508. The buyers' devices may then alert the potential home buyers to the existence of the AR capability, and ask if they wish to be connected with the home computer via its extended local network. If the potential buyers respond "no" or ignore the query, the process ends at step 512. If the potential buyers agree, then the home computer 422 is connected to one or both of the personal devices. The home computer may then ask the potential buyer(s) if they are interested in receiving a virtual tour of the house that is for sale, for display on their personal devices. If the answer is yes, the process continues with step 530 in exemplary flowchart 550, shown in FIG. 5B. If the answer is no, the process continues in step 560 in exemplary flowchart 580, shown in FIG. 5C.

Step 530 in flowchart 550 shown in FIG. 5B is the continuation from step 518 in flowchart 500. When the potential home buyers indicate that they wish to receive a virtual tour, home computer 422 transmits floor plan images for each of the floors in the house for sale, as well as floor plans for the garage (if the house has a garage) or a basement (if the house has a basement) in step 532. An example of a floor plan for the first floor of a house is illustrated schematically in FIG. 6, and described below. It may also transmit other images upon request, such as an image of the backyard, or images of the house that is for sale at different times of the day or during different seasons, for example. When the potential buyers received the floor plans, they may select a room (or kitchen or bathroom) by clicking on the outline of that room in step 534, which may then be displayed in step 536.

In many cases, the potential buyers may have furniture they own (or intend to buy), and would like to see how that furniture might fit into the different rooms in the house. For that reason, home computer 422 may ask the potential home buyers in step 538 if they want to populate an image of the room with images of their furniture (and other items) stored on their personal devices. The images may be top-down two-dimensional images, or they may be a three-dimensional perspective images, for example. If the answer to the query in step 538 is no, the home computer 422 may then ask the potential buyers if they want to select another room in step 546. If the answer to the query in step 546 is yes, the process returns to step 534. If the answer is no, the process ends in step 548.

If the answer to the query in step 538 is yes, the home computer sends an image of the room to the personal devices, and that image as populated with the potential buyers' furniture, is displayed in step 540. In some embodiments, the personal devices transmit images of their furniture to home computer 422, which combines the furniture images with the room image. In other embodiments, the personal devices receive the image of the room and the personal devices populate that image with the images of furniture stored on the personal devices. In step 542, the potential buyers are asked if they wish to select another room. If the answer is yes, the process returns to step 534 so that they can select another room. If the answer is no, the process ends at step 544.

Step 560 in flowchart 580 shown in FIG. 5C is a continuation from step 516 in flowchart 500. In step 562, home computer 422 asks the potential buyers if they would like to download data. If the answer to the query in step 562 is no, the process ends at step 564. If the answer to the query in step 562 is yes, home computer 422 downloads information such as the information shown in FIG. 3, for example, and/or images such as the images shown in FIG. 2 in step 566. The potential buyers are then, in some embodiments, asked if they would like to schedule an actual tour in step 568. If the answer to the query in step 568 is yes, then the home computer suggests dates and times for an appointment with a realtor, and the potential buyers schedule the tour in step 570. If the answer is no, the process ends at step 572.

Figure 6:
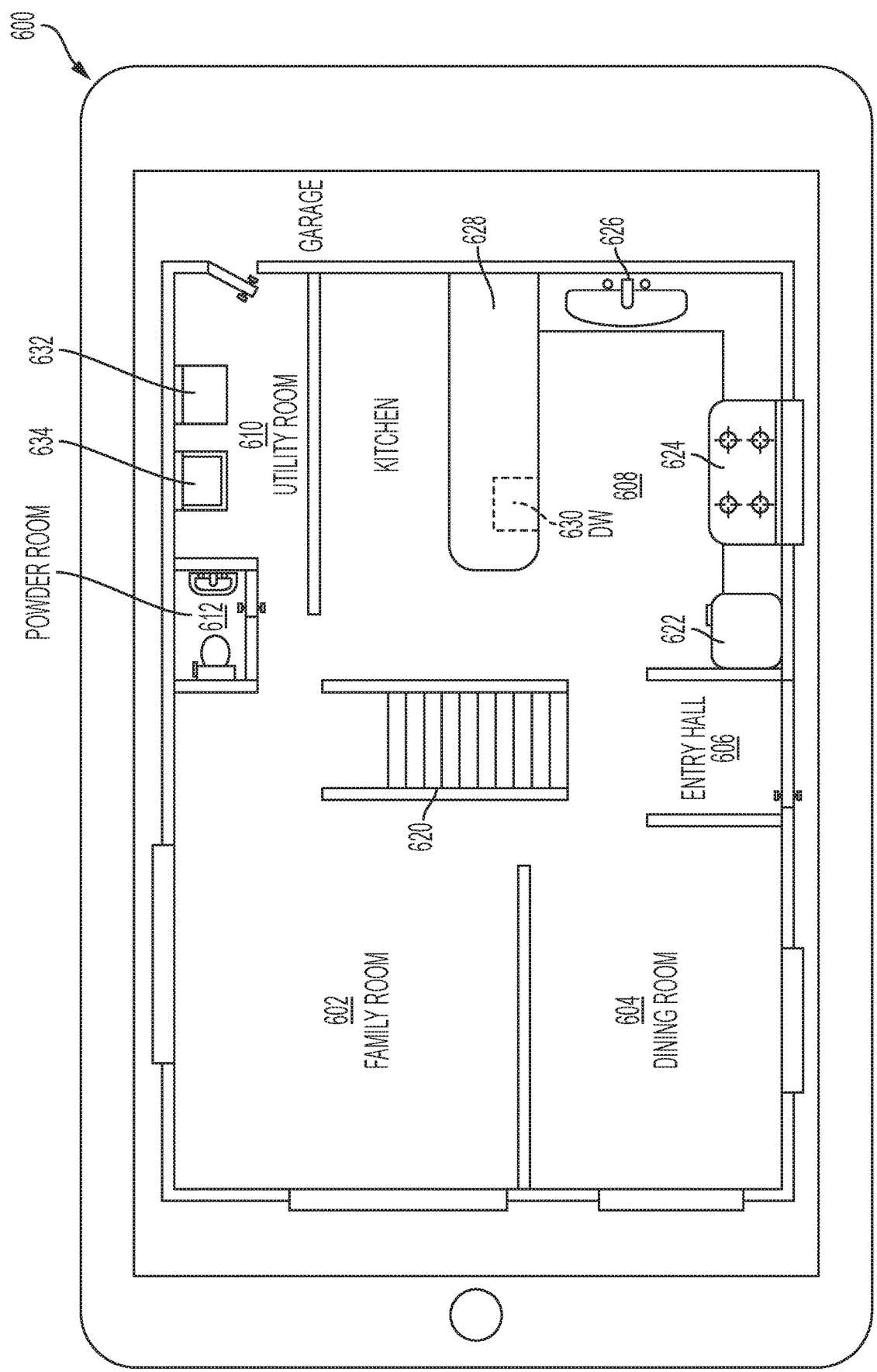
FIG. 6 is an exemplary illustration of the layout of the first floor of a house that is for sale, as it may be displayed on a personal device, in an embodiment.

FIG. 6 is an exemplary illustration of the floor plan 600 for a house that might be on sale. In the example shown in FIG. 6, the first floor of the house has family room 602, dining room 604, stairs 620, entry hall 606, kitchen 608, utility room 610 and powder room 612. The kitchen 608 has a refrigerator 622, a stove 624, a sink 626, a counter 628 and a dishwasher 630. Utility room 610 has a washing machine 634 and a dryer 632. The illustration in FIG. 6 serves to provide a context for the descriptions below.

Figure 7:
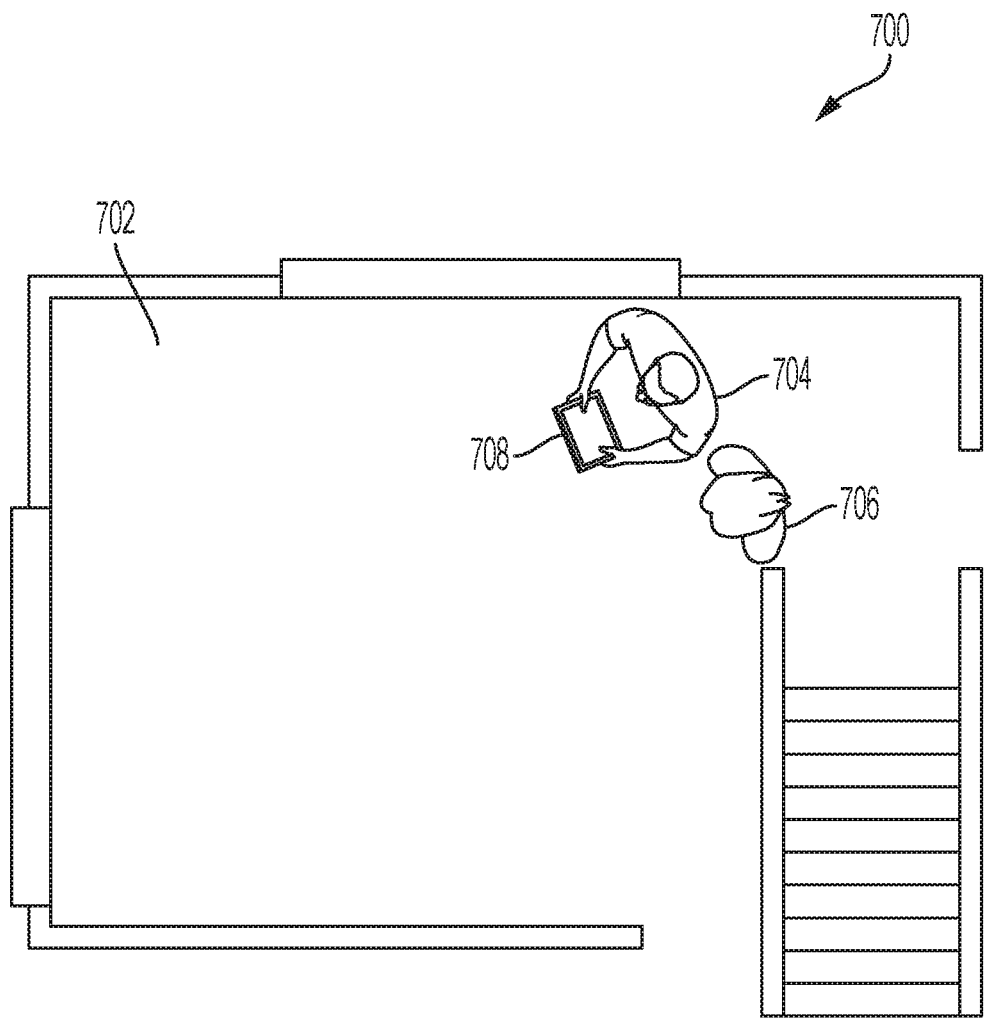
FIG. 7 is a drawing of a family room in the home owner's house, in an embodiment.
Figure 8:
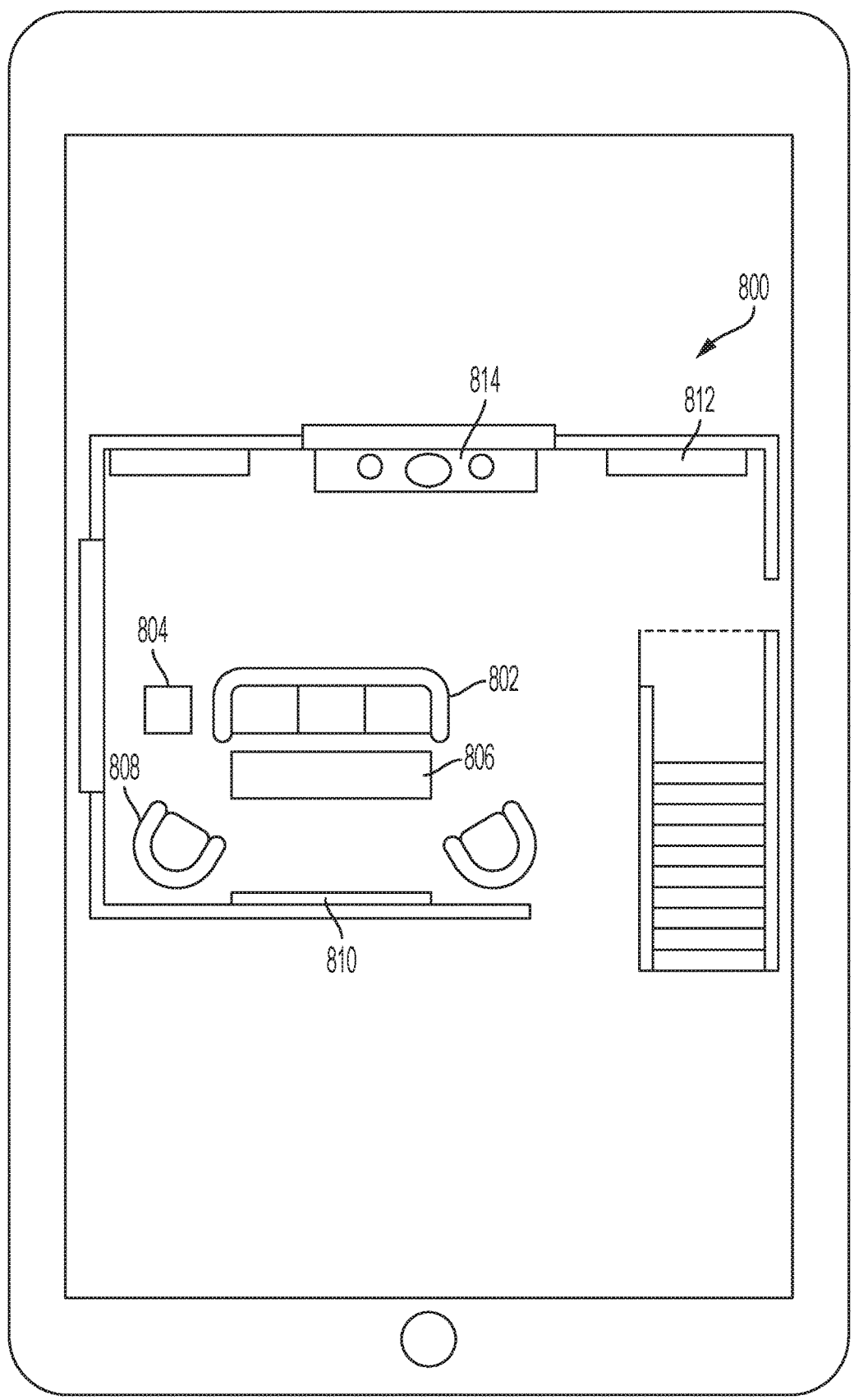
FIG. 8 is an illustration of an exemplary display on a tablet, for example, of the family room of FIG. 7, as it may have been populated with the potential home buyers' furniture, in an embodiment.

FIG. 7 is a top view of an empty room 702 that could be used as a family room, for example. The room has no furniture, since in this example the previous occupants have moved out. The potential buyers—a man 704 and a woman 706, for example—are standing by a door, looking down at the display of the room on a tablet 708 as it might be populated with their furniture. FIG. 8 is an illustration of the family room of FIG. 7, as it might look with the potential buyers' furniture in the family room.

Thus FIG. 8 shows one example as to how the potential buyers' furniture might be disposed in the house's family room, as the images of the furniture may be rendered with the image of the family room. In the image shown in FIG. 8, family room 800 has been populated with a couch 802, an end table 804, a coffee table 806, a TV set 810, bookcases 812, two easy chairs 808 and a side table 814. The potential buyers may select which item of furniture whose image they may wish to insert into the image of the family room, and may select the position of the images of the items of furniture in the room. They may also move the furniture around the room by placing their fingers on the image of a specific piece of furniture on the display and moving it to a different location. They may also try different decoration schemes, such as changing the color of walls, changing the flooring or adding light fixtures, for example.

To the extent that the potential buyers could not find all the information they might be interested in receiving, they could ask questions that may prompt an answer directly from the home computer, or that a person at a remote location might be able to provide. For example, a potential buyer may have a somewhat atypical question, such as do the public schools offer vegetarian meals, or how far is the nearest sports bar. These kinds of questions may not have been anticipated by the real estate firm, but the real estate firm could have someone in the home office who could research the issue and provide answers in a fairly short time frame.

Figure 9:
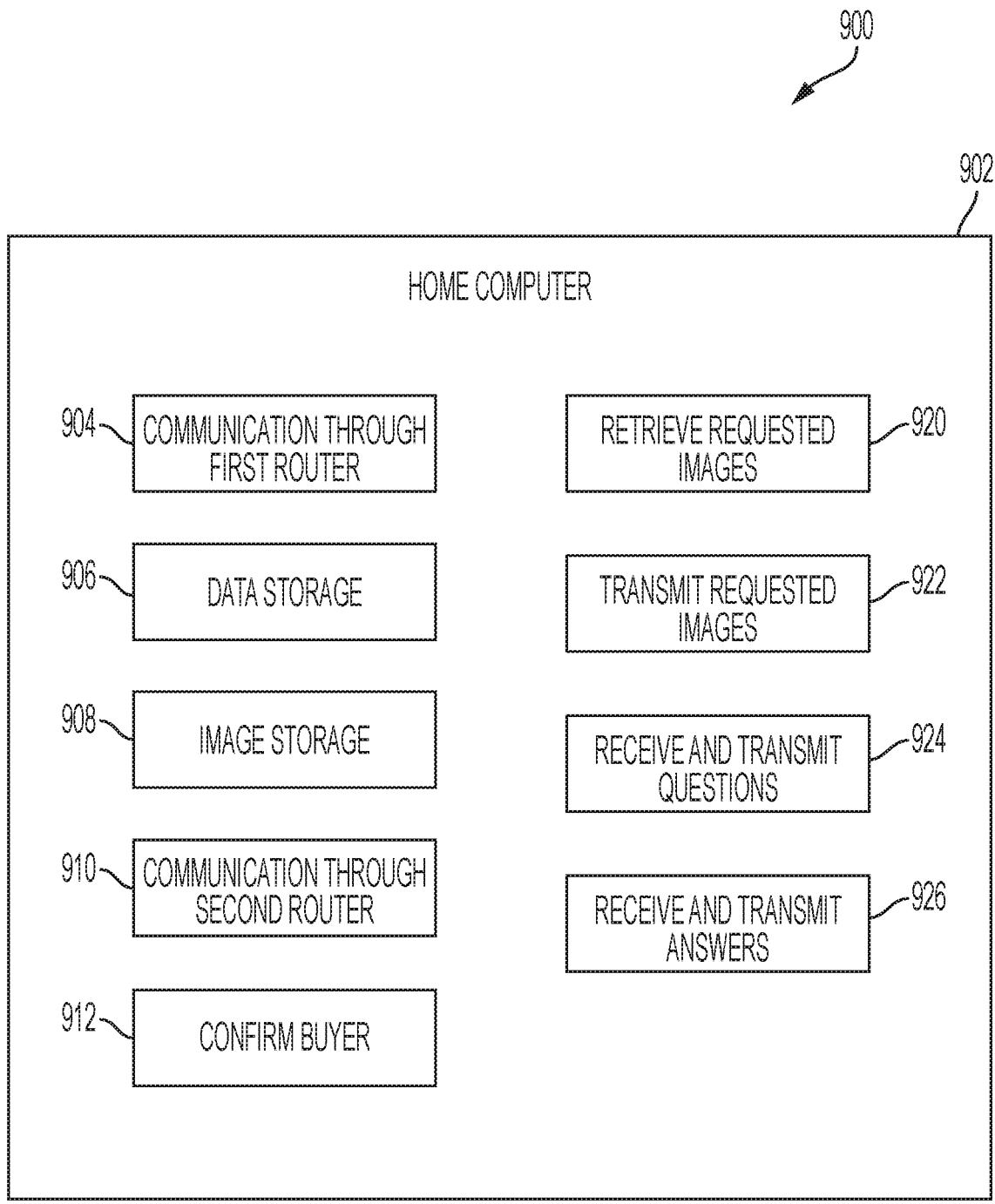
FIG. 9 is a schematic diagram showing apps on a personal computer in the home owner's house that might be used to communicate with potential buyers and a real estate office, for example, in an embodiment.
Figure 10:
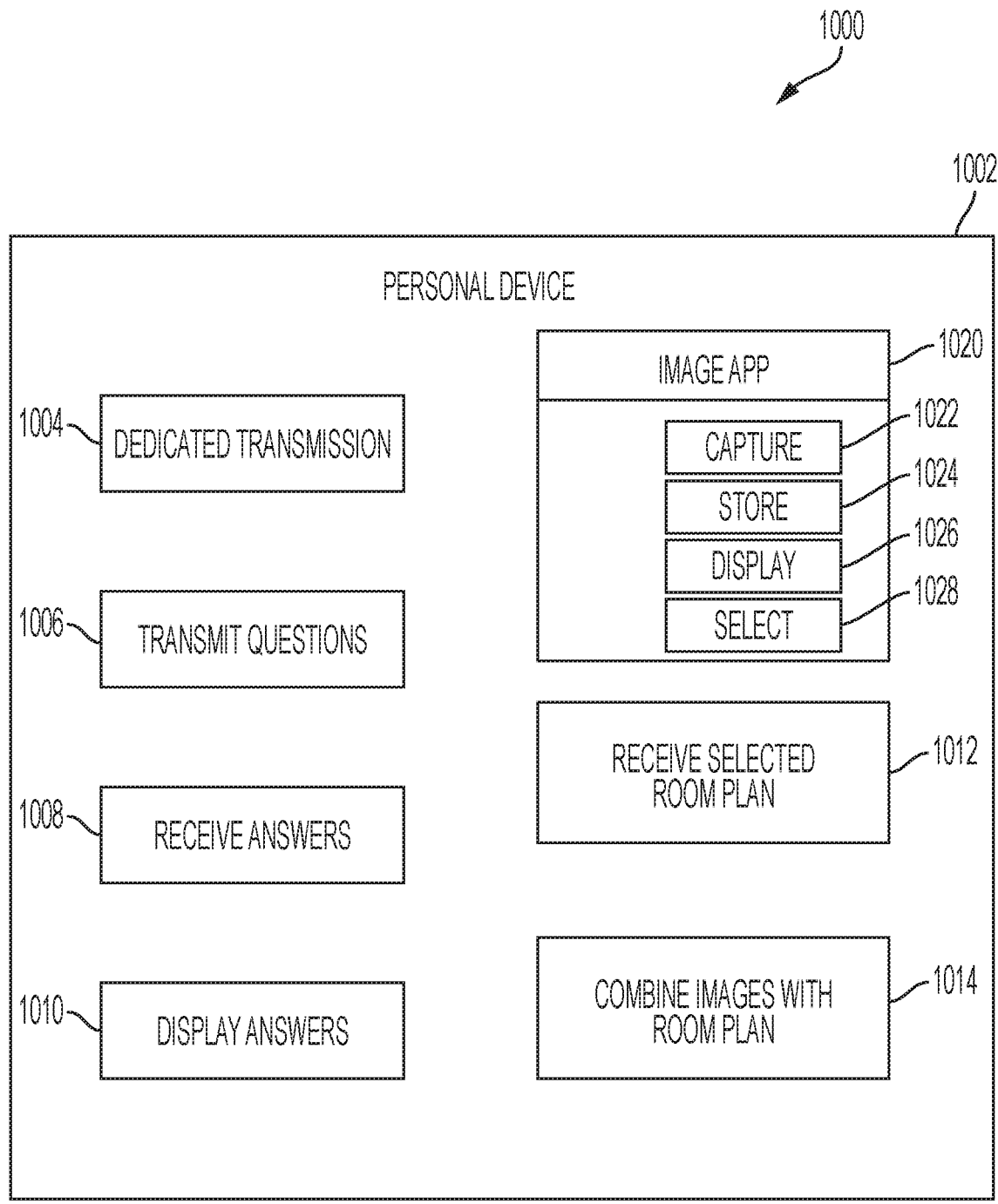
FIG. 10 is a schematic diagram showing apps on the potential home buyers' personal devices that may be used to communicate with a personal computer in the home owner's house, in an embodiment.

FIG. 9 and FIG. 10 show examples of applications that may be housed in a home computer (FIG. 9) and in the personal devices controlled by the potential buyers (FIG. 10). In some embodiments, the application 902 in the home computer may include modules such as a module 904 for communicating via a first router with the home office computer over, for example, the Internet; a module 906 for storing data regarding the house that is for sale, including information such as the exemplary information shown in FIG. 3, as well as other pertinent information; and a module for storing images of the house that is for sale, such as, for example, the images shown in FIG. 2A and FIG. 2B. It may also include a module 910 for communicating with potential buyers via the extended local network controlled by a second router. Module 912 may be used to confirm the identity of the prospective buyer, for example to determine whether that buyer is represented by the same agency that is representing the seller of the home, and/or possibly to ensure that the person has a been approved to receive AR rendered images.

In this exemplary embodiment, module 920, module 922, module 924 and module 926 control the communications with the potential buyers. Thus module 920 may be used to retrieve images requested by potential buyers, and module 922 may be used to transmit those images to the potential buyers' personal devices. Module 924 may be used to receive questions from and transmit questions to the prospective buyers, while module 926 may be used to receive from and transmit answers to those questions. In other embodiments, the functions described above may be carried out using different sets of modules or applications.

FIG. 10 is a schematic diagram that shows exemplary applications that may be housed in personal devices controlled by potential buyers, in some embodiments. Thus module 1004 controls the transmission between the personal devices and the home computer over the extended local network controlled by the second router. Module 1006 may transmit questions from the prospective buyers to the home computer, while module 1008 receives and stores the answers to the questions. Module 1010 displays the answers on the potential buyers' personal devices. In other embodiments, the functions described above may be carried out using different sets of modules or applications.

Image app 1020 may have three modules, for example. Capture app 1022 may capture images such as photos of the potential buyers' furniture or images of furniture or other items obtained from catalogs or downloaded from Internet sites. These images may be stored using storage module 1024, and displayed using display module 1026. Images may be selected for inclusion in AR rendering using selection module 1028. Module 1012 may be used to receive floor plans for any room (or other structure) selected by the potential buyer, and module 1014 may be used to combine selected furniture (or other items) with an actual image of a room (or other structure) to create an AR image of, for example, a room populated with the buyers' furniture (and other items), for example. The AR rendering may also give the buyers the ability to move furniture to different locations in the room, to try different color paint on the walls of the room, different flooring, or different appliances, or to add, move or remove certain structures, such as walls, doors or windows.

In other embodiments, module 1014 for combining images may be housed in the home computer. In that case, the personal device(s) would transmit selected images of items of furniture, for example, with instructions to place the image of the item in certain locations. The locations may be identified, for example, by tapping on the desired location on a display of an image of a room on the personal device.

A typical example of a home buying/selling process enhanced with AR rendering might be as follows. Person(s) with a house to sell visit a real estate office and are provided with a dedicated computer for use solely for rendering AR-enhanced images to potential home buyers. They may also be provided with a router that would control a dedicated extended local network that could reach personal devices outside the typical range of home routers. The extended local network could reach potential buyers out on the street, for example.

At some other time, potential home buyers visit a real estate office, are told about the AR system's capabilities, and have the AR software loaded onto their personal devices. The potential buyers are provided with a buyer-specific password or other security device so that they can join extended local networks dedicated to rendering AR images to potential home buyers. The potential home buyers then visit the house that is for sale (with or without a real estate agent), note the AR logo on the "For Sale" sign, and check their personal devices. The buyers' personal devices detect the extended local network, and ask the potential buyers if they want to join that network. The potential home buyers log on to the extended network. They can then view the floor plans of the house, its basement and garage, obtain information specific to that house, view AR-enhanced images at the house at different times of the year, populate individual rooms with furniture, and so on. They could also ask for additional information, as described above.

As described above, the embodiments disclosed herein allow potential home buyers the opportunity to visit houses for sale on their own (or as accompanied by a real estate agent), without necessarily entering the houses. They could picture the houses as they might appear at different seasons of the year or at different times of the day. They could download, for example, floor plans of houses for sale and envision how their possessions might fit into various rooms of those houses such as family rooms, bedroom, living rooms, studies, dining rooms, kitchens or other rooms or spaces in the house. They could also envision how the house might look like if it were remodeled or added-to. Moreover, to the extent that they could not find all the information that they might need, they could transmit questions to a remote person such as a real estate agent, and, in most cases, receive an answer in a short time, such as in less than ten minutes or in less than twenty minutes, for example.

The AR rendering system would thus allow potential buyers to scout neighborhoods without having to make an appointment with a real estate agent, which might be convenient for the potential buyers. The system would also benefit real estate agents by allowing the potential buyers to make a pre-selection of houses they might be interested in, so that the real estate agents would not have to spend hours showing houses that the potential buyers would actually have no interest in buying. The AR rendering system could also benefit banks and/or insurance companies, by allowing those institutions to provide loan and/or insurance information specific to a particular house, for example.

Although the descriptions above are descriptions of individual houses, embodiments could well include AR rendering of condominiums, coop apartments, offices buildings, office, retail premises, hotels or other structures, for example. In some cases, the AR rendering could also include information such as the existence of a swimming pool, an exercise facility and a concierge service, as well as other types of information that may be useful for potential buyers to know. Moreover, the descriptions above can also apply to potential renters rather than just potential buyers, since potential renters are just as interested in the information that may be available via AR rendering as potential buyers. For example, military personnel may often prefer to rent their residences rather than buy the residences, since they are often redeployed to other locations on short notice.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for providing augmented-reality enhanced images of a house that is for sale comprising:
providing a first augmented-reality application on a computer located at the house, wherein the computer located at the house is connected to a first router in communication with the Internet;
providing a second augmented-reality application on one or more personal devices of potential buyers of the house;
providing a second router at the house that is separate from the first router, wherein the second router is connected to the computer that is configured to communicate with the one or more personal devices of potential buyers, wherein communication between the computer and the one or more personal devices is independent of communication via the first router; and
transmitting images of rooms in the house to the one or more personal devices carried by the potential buyers through the second router;
wherein the potential buyers can manipulate the images on the personal devices to create enhanced-reality images of the rooms in the house.

2. The method of claim 1, wherein the potential buyers manipulate the images by at least one of (a) removing depictions of certain home owner's items from the images of the rooms, and (b) inserting depictions of the potential buyers own items into the images of the rooms.

3. The method of claim 2, wherein the potential buyers own items comprise furniture; and
wherein images and dimensions of the furniture are stored on the personal devices of the potential buyers.

4. The method of claim 1, wherein the potential buyers enter queries regarding the house and receive responses to the queries through the second augmented reality application on the personal devices.

5. The method of claim 1, wherein the personal devices of the potential buyers detect the presence of the first augmented-reality application.

6. The method of claim 1, further comprising transmitting information from the computer in response to questions posed by the potential buyers.

7. The method of claim 1, further comprising determining room dimensions using a LIDAR device.

8. An augmented-reality system comprising:
a computer in a house, wherein the computer is loaded with a first augmented-reality application, wherein the computer in the house is connected to a first router in communication with the Internet;
a personal device owned by a potential home buyer that is loaded with a second-augmented reality application; and
a second router configured to enable communications between the computer in the house and the personal device of the potential home buyer, wherein communication between the computer and the personal device is independent of communication via the first router;
wherein images may be transmitted between the computer and the personal device through the second router using the first augmented-reality application and the second augmented-reality application; and
wherein the personal device is configured to allow the potential home buyer to manipulate the images to create augmented-reality images.

9. The augmented reality system of claim 8, wherein the personal device is configured to allow the potential home buyer to create an augmented-reality image of a room in the house by at least one of (a) removing depictions of at least one item from at least one of the images transmitted between the computer and the personal device, and (b) inserting depictions of at least one item of the potential home buyer into the image.

10. The augmented reality system of claim 8, wherein the second router controls a dedicated extended local network that has an extended range such that it can communicate with personal devices of potential home buyers held on a street in front of the house, wherein the dedicated extended local network is separate from a local network associated with the first router.

11. The augmented-reality system of claim 8, wherein the computer is configured to respond to questions posed by the potential buyer and transmitted to the computer via the second augmented-reality application.

12. The augmented-reality system of claim 8, wherein at least one of the first augmented-reality application and the second augmented-reality application comprises an application that is configured to combine images of rooms in the house with images of furniture of the potential home buyer; and
wherein images and dimensions of the furniture are stored on the personal device of the potential home buyer.

13. The augmented-reality system of claim 8, wherein the personal device is configured to detect the first augmented-reality application on the computer.

14. The augmented-reality system of claim 8, wherein the personal device comprises an application that allows the potential home buyer to select an image of a specific room in the house for display on the personal device.

15. A method for generating augmented-reality images of rooms in a house that is for sale comprising:
receiving a package of information about the house, including at least data and images of the house, at a computer in the house via a first router in communication with the Internet;
transmitting a plan of floors in the house via a second router from the computer in the house to a personal device controlled by a potential home buyer, wherein communication between the computer and the personal device via the second router is independent of communication via the first router;
selecting a room in the house by identifying the room using the plan of floors in the house;
the potential home buyer selecting an image of an item to be combined with an image of the selected room, wherein the image of the item is stored on the personal device of the potential home buyer;
manipulating the image of the selected room by inserting the image of the selected item into the image of the selected room to create an augmented-reality room image;
wherein at least one of the computer and the personal device comprises an augmented-reality application that is configured to combine the image of the selected room with the image of the selected item.

16. The method of claim 15 wherein the selected image is an image of a piece of furniture.

17. The method of claim 15, wherein the augmented-reality application maintains registration of the image of the selected item with the image of the selected room using dimensions of the selected item stored on personal device of the potential home buyer.

18. The method of claim 15, wherein the augmented-reality application allows the potential home buyer to receive an image of the house at a different time of the year.

19. The method of claim 15, further comprising moving the image of the selected item to at least one different location in the image of the room.

20. The method of claim 15, further comprising the computer responding to a question asked by the potential home buyer using the personal device.

\* \* \* \* \*